United States Patent
Amendola et al.

(10) Patent No.: US 6,670,444 B2
(45) Date of Patent: Dec. 30, 2003

(54) PROCESSES FOR SYNTHESIZING BOROHYDRIDE COMPOUNDS

(75) Inventors: Steven C. Amendola, Ocean Township, Monmouth County, NJ (US); Michael T. Kelly, Plainsboro Township, Middlesex County, NJ (US); Jeffrey V. Ortega, Dover Township, Ocean County, NJ (US); Ying Wu, Red Bank Borough, Monmouth County, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 0 days.

(21) Appl. No.: 10/331,674

(22) Filed: Dec. 27, 2002

(65) Prior Publication Data

US 2003/0092877 A1 May 15, 2003

Related U.S. Application Data

(60) Continuation-in-part of application No. 10/116,767, filed on Apr. 4, 2002, and a continuation-in-part of application No. 09/833,904, filed on Apr. 12, 2001, now Pat. No. 6,524,542, which is a division of application No. 09/710,041, filed on Nov. 8, 2000, now Pat. No. 6,433,129.

(51) Int. Cl.$^7$ .............................. C08G 79/08
(52) U.S. Cl. ................. 528/394; 528/240; 528/241; 528/482; 528/486; 528/488; 528/493; 528/495; 528/503
(58) Field of Search ................. 528/394, 240, 528/241, 482, 486, 488, 493, 495, 503

(56) References Cited

U.S. PATENT DOCUMENTS

| | | | |
|---|---|---|---|
| 25,777 A | 10/1859 | Schubert et al. | |
| 2,469,879 A | 5/1949 | Hurd | |
| 2,534,533 A | 12/1950 | Schlesinger et al. | |
| 2,684,888 A | 7/1954 | Pryde | |
| 2,720,444 A | 10/1955 | Banus et al. | |
| 2,741,539 A | 4/1956 | Banus et al. | |
| 2,855,353 A | 10/1958 | Huff et al. | |

(List continued on next page.)

FOREIGN PATENT DOCUMENTS

| | | |
|---|---|---|
| CN | 86108142 | 6/1998 |
| CS | 148173 | 5/1972 |

(List continued on next page.)

OTHER PUBLICATIONS

Maurice E. Indig and Richard N. Snyder, "Sodium Borohydride, An Interesting Anodic Fuel", Journal of the Electrochemical Society, vol. 109, pp. 1104–1106, Nov. 1962.

(List continued on next page.)

*Primary Examiner*—Duc Truong
(74) *Attorney, Agent, or Firm*—Gibbons, Del Deo, Dolan, Griffinger & Vecchione (57) ABSTRACT

The present invention relates to processes for producing borohydride compounds. In particular, the present invention provides efficient processes and compositions for the large-scale production of borohydride compounds of the formula $YBH_4$ by the reaction of a boron-containing compound represented by the formula $BX_3$ with hydrogen or an aldehyde to obtain diborane and HX, and reacting the diborane with a Y-containing base selected from those represented by the formula $Y_2O$, YOH and $Y_2CO_3$ to obtain $YBH_4$ and $YBO_2$. Y is selected from the group consisting of the alkali metals, pseudo-alkali metals, alkaline earth metals, an ammonium ion, and quaternary amines of the formula $NR_4^+$, wherein each R is independently selected from hydrogen and a straight- or branched-chain $C_{1-4}$ alkyl group, and X is selected from the group consisting of halide ions, —OH, —R' and —OR' groups, chalcogens, and chalcogenides, wherein R' is a straight- or branched-chain $C_{1-4}$ alkyl group.

22 Claims, 2 Drawing Sheets

U.S. PATENT DOCUMENTS

| | | |
|---|---|---|
| 2,889,194 A | 6/1959 | McElroy et al. |
| 2,926,989 A | 3/1960 | Pryde |
| 2,926,991 A | 3/1960 | Bragdon |
| 2,928,710 A | 3/1960 | Berner et al. |
| 2,928,719 A | 3/1960 | Berner et al. |
| 2,934,401 A | 4/1960 | Hansley et al. |
| 2,938,767 A | 5/1960 | Huff et al. |
| 2,939,762 A | 6/1960 | Berner et al. |
| 2,942,935 A | 6/1960 | King et al. |
| 2,955,911 A | 10/1960 | Edwards et al. |
| 2,964,378 A | 12/1960 | Brown et al. |
| 2,969,274 A | 1/1961 | Kyllonen |
| 2,970,894 A | 2/1961 | Chappelow et al. |
| 2,974,015 A | 3/1961 | Peterson |
| 2,983,574 A | 5/1961 | Nigon |
| 2,983,575 A | 5/1961 | Cohen et al. |
| 2,985,510 A | 5/1961 | Kalb |
| 2,992,072 A | 7/1961 | Huff et al. |
| 2,992,266 A | 7/1961 | McElroy |
| 3,002,806 A | 10/1961 | Governale et al. |
| 3,014,059 A | 12/1961 | Bush et al. |
| 3,014,060 A | 12/1961 | Bush et al. |
| 3,021,197 A | 2/1962 | Clark et al. |
| 3,022,138 A | 2/1962 | Clark et al. |
| 3,028,221 A | 4/1962 | Schechter et al. |
| 3,029,128 A | 4/1962 | Chamberlain |
| 3,042,485 A | 7/1962 | Edwards |
| 3,047,358 A | 7/1962 | Jenkner |
| 3,077,376 A | 2/1963 | Schubert et al. |
| 3,079,224 A | 2/1963 | Huff |
| 3,152,861 A | 10/1964 | Logan et al. |
| 3,161,469 A | 12/1964 | Ashby et al. |
| 3,164,441 A | 1/1965 | Goerrig |
| 3,171,712 A | 3/1965 | Edwards et al. |
| 3,210,157 A | 10/1965 | Lewis, Jr. et al. |
| 3,216,797 A | 11/1965 | Murib et al. |
| 3,219,412 A | 11/1965 | Hunt et al. |
| 3,222,121 A | 12/1965 | Jenkner et al. |
| 3,306,704 A | 2/1967 | Campbell et al. |
| 3,433,605 A | 3/1969 | Knorre et al. |
| 3,459,514 A | 8/1969 | Johnston et al. |
| 3,468,630 A | 9/1969 | Raisor et al. |
| 3,471,268 A | 10/1969 | Bontempelli et al. |
| 3,473,899 A | 10/1969 | Cooper |
| 3,474,899 A | 10/1969 | Carlsson et al. |
| 3,505,035 A | 4/1970 | Horn et al. |
| 3,511,710 A | 5/1970 | Jung et al. |
| 3,515,522 A | 6/1970 | Pecak et al. |
| 3,993,732 A | 11/1976 | Filby |
| 4,002,726 A | 1/1977 | Filby |
| 4,070,261 A | 1/1978 | Merritt et al. |
| 4,904,357 A | 2/1990 | Sharifian et al. |
| 4,931,154 A | 6/1990 | Hale et al. |
| 5,294,423 A | 3/1994 | Lorthioir et al. |
| 5,886,229 A | 3/1999 | Corella, II et al. |
| 6,433,129 B1 | 8/2002 | Amendola et al. |
| 6,524,542 B2 | 2/2003 | Amendola et al. |

FOREIGN PATENT DOCUMENTS

| | | |
|---|---|---|
| DE | 947702 | 8/1956 |
| DE | 949943 | 9/1956 |
| DE | 950062 | 10/1956 |
| DE | 950846 | 10/1956 |
| DE | 1036222 | 8/1958 |
| DE | 1053476 | 3/1959 |
| DE | 1058478 | 6/1959 |
| DE | 1095797 | 12/1960 |
| DE | 1262981 | 3/1968 |
| EP | 0313306 | 4/1989 |
| FR | 1301172 | 7/1962 |
| GB | 853727 | 11/1960 |
| GB | 1104200 | 2/1968 |
| JP | 2100376 | 4/1990 |
| NL | 6613329 | 9/1966 |
| WO | WO0174710 | 10/1901 |

OTHER PUBLICATIONS

CA:75:145084 abs of Tr. Kazan. Khim–Tekhnol. Inst. By Mochalov et al. 40(1) pp 203–211 1969.

CA:122:22560 abs of Journal of American Chem Society by Godfroid et al. 116(26) pp 12107–12108 1994.

CA:82:50890 abs of Izv. Akad. Nauk. SSR. Ser, Khim by Titiov et al. (11) pp. 2410–2414 1974.

CA:100:60908 abs of Acta Cient. Venez by A. Barriola 34(1) pp 25–27 1983.

A. Burg, H.I. Schlesinger, "Hydrides of Boron. III Dimethoxyborine"; J. Am. Chem. Soc., Oct. 1933, 55, p. 4020–4025.

H.C. Brown, H.I. Schlesinger, A. Burg; "Hydrides of Boron XI. The Reaction of Diborane with Organic Compounds Containing a Carbonyl Group"; J. Am. Chem. Soc., Mar. 1939, 61, p. 673–680.

Schlesinger, H.I.; Brown, H.C.; Hoekstra, H.R.; Rapp, L.R.; "Reactions of Diborane with Alkali Metal Hydrides and Their Additional Compounds. New Syntheses of Borohydrides. Sodium and Potassium Borohydrides"; J. Am. Chem. Soc., Jan. 5, 1953, 75, p. 199–204.

Brown, H.C.; Schlesinger, H.I.; Sheft, I.; Ritter, D.M.; New Developments in the Chemistry of Diborane and the Borohydrides. J. Am. Chem. Soc., Jan. 5, 1953, 75, 186–225.

A.J. King, F.A. Kanda, V.A. Russell, & Walter Katz, A New Method for the Preparation of Borohydrides, Syracuse University, Syracuse, NY), J. Am. Chem. Soc., vol. 78, p. 4176, Jun. 19, 1956.

Jolles, Z.E., Bromine and Its Compounds:, Academic Press, pp. 81–89, 1966.

Hughes, R.L., Production for the Boranes and Related Research; Midwest Research Institute, 1967.

Herbert C. Brown, Yong Moon Choi and S. Narasimhan for "Additional Compounds of Alkali Metal Hydrides. 22. Convenient Procedures for the Preparation of Lithium Borohydride from Sodium Borohydride and Borane–Demethyl Sulfide in Simple Ether Solvents", Inorg. Chem. pp. 3657–3661, Mar. 25, 1982.

Huheey, James E., "Inorganic Chemistry", $3^{rd}$ Edition, Harper Collins, Chapter 14, 1983.

Hubbard, John L., Tetrahedron Letters; Purification of Sodium and Potassium Hydrides; Preparation of Trialkyl–borohydrides with Exceptionally Larger Steric Requirements; J. American Chem. Soc., 1988, 29, 3197–3200;.

"CRC Handbook of Chemistry and Physics", $69^{th}$ Edition, 1988–1989.

Russian Article, Tom 34, 1989.

Shriver et al., "Inorganic Chemistry", W.H. Freeman Company, 1990, pp. 170–175.

S. Narasimhan; K. Ganeshwar Prasad and S. Madhavan, Calcium Borohydride: A Reagent For Facile Conversion of Carboxylic Esters to Alcohols and Aldehydes, Synthetic Communications, 25(11), 1689–1697 (1995).

U.S. patent application No. 20010022960, titled "Hydrogen generating method and hydrogen generating apparatus" to Kojima et al., filed Sep. 20, 2001.

PROCESSES FOR SYNTHESIZING BOROHYDRIDE COMPOUNDS

RELATED APPLICATIONS

This application is a continuation-in-part of U.S. patent application Ser. No. 09/833,904, filed Apr. 12, 2001 now U.S. Pat. No. 6,524,542 and U.S. patent application Ser. No. 10/116,767, filed Apr. 4, 2002 now Preexam Processing which, in turn, is a divisional application of U.S. patent application Ser. No. 09/710,041, filed Nov. 8, 2000, now U.S. Pat. No. 6,433,129, issued Aug. 13, 2002.

FIELD OF THE INVENTION

The present invention relates to processes for producing borohydride compounds. In particular, the present invention provides efficient processes for the large-scale production of borohydride compounds.

BACKGROUND OF INVENTION

Environmentally friendly fuels, e.g., alternative fuels to hydrocarbon based energy sources, are currently of great interest. One such fuel is borohydride, which can be used directly as an anodic fuel in a fuel cell or as a hydrogen storage medium, e.g., hydrogen can be liberated by the reaction of sodium borohydride with water, which produces sodium borate as a byproduct. As with all fuels, borohydride must be manufactured from readily available materials. Thus, there is a need for improved and energy efficient industrial scale manufacturing processes for producing borohydride compounds.

Typical industrial processes for the production of sodium borohydride are based on the Schlesinger process (Equation 1) or the Bayer process (Equation 2), which are both described below. Equation 1 illustrates the reaction of alkali metal hydrides with boric oxide, $B_2O_3$, or trimethyl borate, $B(OCH_3)_3$, at high temperatures, e.g., ca. 330° to 350° C. for $B_2O_3$ and 275° C. for $B(OCH_3)_3$.

$$4NaH + B(OCH_3)_3 \rightarrow 3NaOCH_3 + NaBH_4 \quad (1)$$

$$Na_2B_4O_7 + 16Na + 8H_2 + 7SiO_2 \rightarrow 4NaBH_4 + 7Na_2SiO_3 \quad (2)$$

The primary energy cost of these processes stems from the requirement for a large amount of sodium metal, e.g., 4 moles of sodium per mole of sodium borohydride produced. Sodium metal is commercially produced by electrolysis of sodium chloride with an energy input equivalent to about 37,500 BTU (39,564 KJ) per pound of sodium borohydride produced. In contrast, the hydrogen energy stored in borohydride is about 10,752 BTU (11,341 KJ) of hydrogen per pound of sodium borohydride. The Schlesinger process and the Bayer process, therefore, do not provide a favorable energy balance, because the energy cost of using such large amounts of sodium in these reactions is high compared to the energy available from sodium borohydride as a fuel.

Furthermore, in view of the large quantities of borohydride needed for use, e.g., in the transportation industry, these processes would also produce large quantities of $NaOCH_3$ or $Na_2SiO_3$ waste products. Since these byproducts are not reclaimed or reused, further energy and/or expense would need to be expended to separate and properly dispose of these materials.

Typical improvements of the prior art describe simple modifications of the two processes given in equations (1) and (2). As such, however, these improvements also suffer from the disadvantages stated above and do not provide any improved energy efficiency. It can be seen, therefore, that the widespread adoption of borohydride as a source of hydrogen would almost necessitate a recycle process that would allow the regeneration of borohydride from the borate byproduct. Thus, borohydride can be used as a fuel, and the resulting borate can then be recycled back to generate borohydride. However, such a process cannot rely on the same sodium stoichiometry shown in the current borohydride manufacture processes, e.g., the Schlesinger process of Equation (1) or the Bayer process of Equation (2).

The present invention provides processes for producing large quantities of borohydride compounds, which overcome the above-described deficiencies. In addition, the efficiencies of the processes of the present invention can be greatly enhanced over the typical processes for producing borohydride compounds.

SUMMARY OF THE INVENTION

In one embodiment of the present invention, a process is provided for producing borohydride compounds, which includes reacting the boron-containing compound $BX_3$ with hydrogen to obtain diborane ($B_2H_6$) which, is turn, reacted with a Y-containing base selected from those represented by the formulae $Y_2O$, $Y_2CO_3$ and $YOH$ to obtain $YBH_4$ and a $YBO_2$, wherein Y is selected from the group consisting of the alkali metals, pseudo-alkali metals, alkaline earth metals, an ammonium ion, and quaternary amines of formula $NR_4^+$, wherein each R is independently selected from hydrogen and straight- or branched-chain $C_{1-4}$ alkyl groups; and X is selected from the group consisting of halide ions, hydroxyl, alkyl or alkoxy groups, chalcogens, and chalcogenides.

In another embodiment of the present invention, a process is provided for producing borohydride compounds, which includes reacting a boron-containing compound of the formula $BX_3$ with a Y-containing base of the formula YH to obtain $YHBX_3$; and separately reacting $BX_3$ with hydrogen to obtain diborane which is, in turn, reacted with $YHBX_3$ to obtain $YBH_4$ and $BX_3$, wherein X and Y are as defined above.

In either of these embodiments, the Y-containing base of the formula $Y_2O$ and the boron-containing compound of the formula $BX_3$ can be obtained by the following processes. The first process includes: (A) reacting a borate of the formula $YBO_2$ with $CO_2$ and $H_2O$ to obtain $YHCO_3$, and borax; (B) heating $YHCO_3$ to obtain $Y_2O$, $CO_2$ and $H_2O$; (C) separately reacting borax with an acid to obtain boric acid $B(OH)_3$ which is isolated and dehydrated to $B_2O_3$; (D) reacting the $B_2O_3$ with carbon and $X_2$ to obtain $BX_3$ and $CO_2$. The second process includes: (I) reacting a borate of the formula $YBO_2$ with $CO_2$ and an alcohol to obtain $YHCO_3$ and $B(OR)_3$ wherein R is a lower alkyl group; (II) heating $YHCO_3$ to obtain $Y_2O$, $CO_2$ and $H_2O$; (III) reacting the $B(OR)_3$ with $H_2O$ to obtain $B(OH)_3$, which is dehydrated to form $B_2O_3$; and (IV) reacting the $B_2O_3$ with carbon and $X_2$ to obtain $BX_3$ and $CO_2$. The Y-containing base compounds of the formula $Y_2CO_3$ can be obtained by replacing steps (B) and (II) with the following step (B2): converting the $YHCO_3$ to $Y_2CO_3$, $CO_2$ and $H_2O$. Alternatively, the boron-containing compounds $BX_3$ can be obtained by replacing steps (C) and (D) with one of the following steps: (C1) where X is a halide, reacting borax with carbon and $X_2$ to obtain $BX_3$ and $CO_2$; or (C2), where X is an alkoxy group, reacting borax with an alcohol to obtain $BX_3$.

In still another embodiment of the present invention, a process is provided for producing borohydride compounds, which includes: (A) reacting a borate of the formula $YBO_2$ with $CO_2$ and $H_2O$ to obtain $YHCO_3$ and a $B_2O_3$ compound; (B) heating the $YHCO_3$ to obtain $Y_2O$, $CO_2$, and $H_2O$; (C) reacting the $B_2O_3$ compound with an alcohol to obtain $BX_3$; (D) reacting methane with the $Y_2O$ to obtain Y, carbon monoxide and $H_2$; (E) reacting the Y with $H_2$ to obtain YH; (F) reacting the $BX_3$ with the YH to obtain $YHBX_3$; (G) separately reacting $BX_3$ with $H_2$ to obtain $B_2H_6$ and HX; and (H) reacting the $YHBX_3$ with $B_2H_6$ to obtain $YBH_4$ and $BX_3$ wherein Y and X are as defined above.

BRIEF DESCRIPTION OF THE DRAWINGS

Further objects and advantages of the present invention will be more fully appreciated from a reading of the detailed description when considered with the accompanying drawings wherein.

DETAILED DESCRIPTION OF THE INVENTION

The present invention includes processes for producing borohydride compounds from sodium borate or sodium borate ores, such as borax (referred to herein as "borate compounds"). Each step of these processes can be conducted in a batchwise or continuous manner, as is well-known to the skilled artisan. The term "about," as used herein, means +10% of the stated value.

The overall cost of producing borohydride compounds is net hydrogenation of a borate compound, such as, sodium borate, borax ore, or higher borates of the formula $Na_2O \cdot xB_2O_3$, where x is 2 to 5, such as, tetraborate and pentaborate, to give sodium borohydride and water as shown in equation (3).

$$NaBO_2 + H_2 \rightarrow NaBH_4 + H_2O \quad (3)$$

The hydrogen can be obtained from any suitable source, as is well known to one skilled in the art. Where the hydrogen gas is liberated by the steam reformation of methane, for example, the net reaction can be represented as illustrated in equation (4):

$$NaBO_2 + CH_4 \rightarrow NaBH_4 + CO_2 \quad (4)$$

These processes eliminate the dependence on large quantities of sodium metal that exists in current industrial processes for borohydride synthesis, thereby removing a large energy cost in borohydride production. In addition, these processes can allow for recycle of excess reagents and byproducts produced within the process in order to provide greater efficiency in the production of sodium borohydride.

The basic starting material of the present process is a borate compound, e.g., $YBO_2$, wherein Y is selected from the group consisting of $H^+$, alkali metal ions, e.g., $Li^+$, $Na^+$, $K^+$, $Rb^+$, $Cs^+$, and $Fr^+$; pseudo-alkali metal ions, e.g., $Tl^+$; an ammonium ion ($NH_4^+$); alkaline earth metal ions, e.g., $Be^{++}$, $Mg^{++}$, $Ca^{++}$, $Sr^{++}$, and $Ba^{++}$; and quaternary amines represented by the formula $NR_4^+$, wherein each R is independently selected from hydrogen and straight- or branched-chain $C_{1-4}$ alkyl groups. Y is preferably selected from the group consisting of $Na^+$, $Li^+$, $K^+$, $Mg^{++}$, and $Ca^{++}$, most preferably $Na^+$ or $Li^+$. Alternatively, the starting material $YBO_2$ can be replaced with other sodium borates represented by the formula $Na_2O \cdot xB_2O_3$, wherein x is 1 to 5, or hydrated borates represented by the formula $Na_2O \cdot xB_2O_3 \cdot yH_2O$, wherein y is 0.5 to 10, e.g., $Na_2O \cdot 2B_2O_3 \cdot 5H_2O$, also represented as $Na_2B_4O_7 \cdot 5H_2O$. overall, there starting materials can be expressed as $Na_2O \cdot xB_2O_3 \cdot yH_2O$ wherein x is 1–5 and y with 0–10 wherein y is zero representing the non-hydrated borates.

From the starting material of a borate compound, such as $YBO_2$, reactions can be conducted to create a Y-containing base, e.g., $Y_2O$, and a boron-containing compound, e.g., $BX_3$, wherein X is selected from the group consisting of halide ions, i.e. F, Cl, Br, I, and At; —OH, R' or —OR' groups; chalcogens, i.e. O, S, Se, Te, and Po; and the chalcogenides, such as —SR, —SeR, and —TeR, wherein R is as defined above and R' is a straight- or branched-chain $C_{1-4}$ alkyl group. In accordance with the present invention, X is preferably a halide ion or an alkoxy group.

For example, in one embodiment of the process of the invention wherein X is an alkoxy group, the Y-containing base and the boron-containing compound can be obtained by the following set of chemical reactions (5a) to (5c). In equation (Sc), the conversion of $YHCO_3$ to $Y_2O$, carbon dioxide and water is carried out by heating to a temperature of from about 400° C. to about 1000° C.:

$$4YBO_2 + 2CO_2 + H_2O \rightarrow 2YHCO_3 + Y_2O \cdot 2B_2O_3 \quad (5a)$$

$$Y_2O \cdot 2B_2O_3 + 12HX \rightarrow 4BX_3 + 2YOH + 5H_2O \quad (5b)$$

$$2YHCO_3 \rightarrow Y_2O + 2CO_2 + H_2O \quad (5c)$$

$$2YOH \rightarrow Y_2O + H_2O \quad (5d)$$

The above set of reactions illustrates when Y is chosen to have a $1^+$ valence. When Y is chosen to have a $2^+$ valence, the stoichiometry can be adjusted accordingly. Such obvious changes in stoichiometry would be clearly evident to the skilled artisan. All of the following reactions assume that Y is chosen to have a valence of $1^+$.

The reaction of equation (5c) can be substituted with the following reaction of equation (5ci).

$$2YHCO_3 \rightarrow Y_2CO_3 + H_2O + CO_2 \quad (5ci)$$

The conversion shown in equation (5ci) can be conducted at a much lower temperature than equation (5c), i.e. a temperature from about 50° to about 120° C. The conversion is carried out in an appropriate apparatus, such as a rotary drier. The solid $Y_2CO_3$ can be removed from the gaseous mixture of water and carbon dioxide by any method and/or process known to the skilled artisan.

After the Y-containing base and the boron-containing compound have been obtained, a Y-borohydride can be formed by a variety of processes. In one embodiment, the Y-borohydride can be obtained by the reactions of the following set of equations (6a) to (6g):

$$CH_4 + Y_2O \rightarrow 2Y + CO + 2H_2 \quad (6a)$$

$$2Y + H_2 \rightarrow 2YH \quad (6b)$$

$$2BX_3 + 2YH \rightarrow 2YHBX_3 \quad (6c)$$

$$CH_4 + H_2O \rightarrow 3H_2 + CO \quad (6d)$$

$$2CO + 2H_2O \rightarrow 2H_2 + 2CO_2 \quad (6e)$$

$$2BX_3 + 6H_2 \rightarrow B_2H_6 + 6HX \quad (6f)$$

$$2YHBX_3 + B_2H_6 \rightarrow 2YBH_4 + 2BX_3 \quad (6g)$$

Note that, if hydrogen is obtained from commercial sources, reactions (6d) and (6e) can be optional. In another embodiment, the Y-borohydride can be obtained by substituting reaction (6g) with the following reaction (6gi):

$$2Y_2O+2 B_2H_6 \rightarrow 3YBH_4+YBO_2 \tag{6gi}$$

Alternatively, reaction (6h) below can be substituted for the reactions (6f) and (6g):

$$2YHBX_3+6H_2 \rightarrow 2YBH_4+6HX \tag{6h}$$

Additionally, instead of hydrogen in equation (6f), $BX_3$ can be reacted with an aldehyde, such as formaldehyde ($CH_2O$), benzaldehyde ($C_6H_5CHO$), or acetaldehyde ($CH_3CHO$) in the presence of a copper metal catalyst. These aldehyde reactions can be run in an appropriate pressurized apparatus, such as an autoclave, at about 380° to about 420° C. One skilled in the art would recognize that the stoichiometry of equation (9f) would have to be adjusted accordingly.

If the reaction of equation (5ci) described above is used, the reaction of equation (6a) can be substituted with the following reaction of equation (6ai).

$$Y_2CO_3+2C \rightarrow 2Y+3CO \tag{6ai}$$

The reaction of equation (6ai) can be conducted by adding heat in the presence of carbon, as is described in Hughes, "Production of the Boranes and Related Research," pp. 12.

The overall process of this embodiment, with or without the alternative substitute reaction, results in the following net reaction (7):

$$YBO_2+CH_4 \rightarrow YBH_4+CO_2 \tag{7}$$

In another embodiment, halogens, i.e. $F_2$, $Cl_2$, $Br_2$, $I_2$, and $At_2$, can be used in a variation of the embodiment using equations (5a) to (5c) to obtain the Y-containing bases and the boron-containing compound. In this embodiment, equation (5b) is replaced with equations (5e) to (5g) below:

$$Y_2O \cdot 2B_2O_3+2HX+5H_2O \rightarrow 4B(OH)_3+2YX \tag{5e}$$

$$4B(OH)_3 \rightarrow 2B_2O_3+6H_2O \tag{5f}$$

$$B_2O_3+3/2C+3X_2 \rightarrow 2BX_3+3/2CO_2 \tag{5g}$$

wherein C is carbon, and X is a F, Cl, Br, I, or At ion, preferably Cl or Br. Alternatively, the carbon can be replaced with methane as illustrated by equation (5h) below:

$$B_2O_3+3/2CH_4+3X_2 \rightarrow 2BX_3+3/2CO_2+H_2 \tag{5h}$$

wherein X is F, Cl, Br, I, or At ions, preferably a Cl or Br ion.

When the halogen embodiment is utilized in conjunction with equations (6a) to (6g) to obtain the Y-borohydride, the halogen can optionally be reclaimed for reuse from the HX produced in the reaction of equation (6f) as illustrated in equation (8) below:

$$6HX+3/2O_2+CuX \text{ (solid)} \rightarrow 3X_2+3H_2O \tag{8}$$

wherein CuX is a catalyst that is not consumed in the process, and X in CuX is Cl, Br, or I.

Any of the above-described processes of obtaining a Y-containing base and a boron-containing compound can be used with any of the above-described processes for obtaining a Y-borohydride.

In still another embodiment of the present invention, X can be independently chosen to be different throughout a complete process, i.e., a particular process for obtaining a Y-containing base and a boron-containing compound, as described above, in combination with a particular process for obtaining a Y-borohydride, as described above. When X is changed in a complete process, it is preferable to choose the different X's to promote regeneration and use of a product as a reactant in a different reaction.

For example, in a combination of equations (5a) to (5c) and equations (6a) to (6g), or a combination of equations (5e) to (5g) and equations (6a) to (6g), X can be chosen to be a halide, e.g. F, Cl, Br, I, or At, in equations (6c) and (9f). This would allow recycling of the HX produced in equation (6f) for use in equation (5e). Similarly, X can be separately chosen to be an alkoxy, e.g., —$OCH_3$, for equations (6c) and (6g). This would allow recycling of the $BX_3$ produced in equation (6g) for use in equation (6c).

Figure 1:
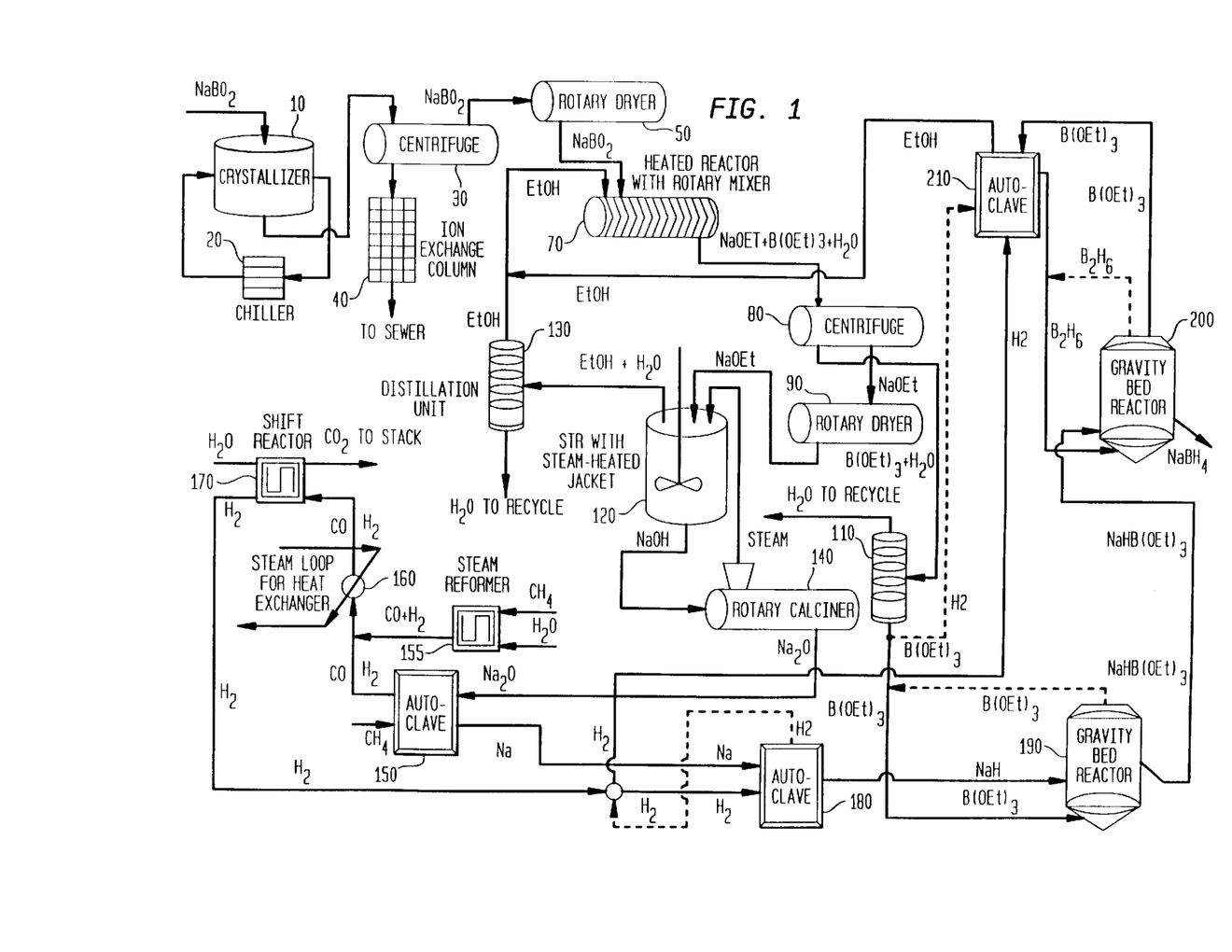
FIG. 1 is a flow diagram, which illustrates one embodiment for producing borohydride compounds in accordance with the present invention.

In an embodiment of the present invention, as illustrated in FIG. 1, $YBO_2$ is chosen to be sodium borate and HX is chosen to be HOR, i.e. an alcohol. The sodium borate and the alcohol are reacted to produce a trialkyl borate. A portion of the trialkyl borate is converted to alkali metal trialkoxy borohydride, and the remainder converted to diborane. The trialkoxy borohydride and the diborane can then be reacted to form the desired borohydride compound. This process can be further described in part by the following set of chemical reactions and formulae.

First, sodium borate from rotary dryer 50 can be reacted with ethanol in an appropriate reactor, as provided in equation (9).

$$NaBO_2+CO_2+3EtOH \rightarrow NaHCO_3+B(OEt)_3+H_2O \tag{9}$$

For example, this reaction can be performed in a heated reactor with a rotary mixer 70, such as a PORCUPINE PROCESSOR produced by The Bethlehem Corporation of Easton, Pa., as illustrated in FIG. 1. In such an apparatus, a slurry of sodium borate and ethanol can be stirred together by a heated screw, which allows mixing of the reagents at temperatures ranging from about room temperature to about 70° C., preferably from about 50° C. to about 70° C. and pressures from about 0 to about 100 psi (6.8 atm.), preferably from about 1 to about 2 atm. Acids such as inorganic mineral acids or organic acids, PTFE beads, or carbon dioxide as shown in equation (9), are added to promote the reaction. In a continuous process, the reagents are introduced into one end of the reactor, and the trialkoxy borane can be removed by distillation as it forms. Depending on the choice of acid, various sodium salts, such as $NaHCO_3$, are produced and can be separated to use as reactant in another reaction within the process.

For process convenience, the reaction of equation (9) may be carried out alternatively in two separate steps: first converting $NaBO_2$ to borax ($Na_2O \cdot 2B_2O_3$) in water (Equation 9a), then converting borax to $B(OEt)_3$ in ethanol (Equation 9b).

$$4NaBO_2+2CO_2+H_2O \rightarrow 2NaHCO_3+Na_2O \cdot 2B_2O_3 \tag{9a}$$

$$Na_2O \cdot 2B_2O_3+12EtOH \rightarrow 4 B(OEt)_3+2NaOH+5H_2O \tag{9b}$$

After separation in an appropriate apparatus, such as a centrifuge 80, the triethyl borate can be dried in an appropriate apparatus, such as a distillation unit 110. The water can be recycled for use in other chemical reactions. All or a portion of the dried triethy lborate, $B(OEt)_3$ is then reacted with sodium hydride in an appropriate apparatus to provide sodium triethoxy borohydride, $NaHB(OEt)_3$, as provided in equation (10).

$$B(OEt)_3 \text{ (excess)}+NaH \rightarrow NaHB(OEt)_3 \tag{10}$$

An important distinction should be drawn between equation (10) in the present invention and the Schlesinger process. In the Schlesinger process, trimethyl borate is added to excess sodium hydride (NaH), and the reaction driven to yield sodium borohydride and sodium methoxide. The excess NaH is utilized to ensure that all intermediate borane compounds are reduced completely to borohydride. In an example of the processes of the present invention, however, an alkali metal hydride, e.g., sodium hydride, can be added to excess trialkyl borate, e.g., triethyl borate, and the reaction only proceeds to form an alkali metal trialkoxyborohydride, e.g., sodium triethoxyborohydride, $NaBH(OEt)_3$.

The reaction of equation (10) is exothermic. For example, this reaction can be performed in a gravity bed reactor 190, as illustrated in FIG. 1. In such an apparatus, excess liquid triethyl borate can be added to solid sodium hydride in a reactor equipped with paddle stirring. The mixture can be maintained at a temperature from about 0° C. and about 100° C., preferably from about 60° to about 70° C., for about 1 to about 24 hours, preferably from about 1 to about 6 hours, with stirring to disperse the solid. The excess borane can be removed by conventional distillation, not shown, to give solid sodium triethoxyborohydride in quantitative yield.

A portion of the triethyl borate obtained from the reaction of equation (9) can be directed to an appropriate pressurized reactor and reacted with hydrogen gas to provide diborane ($B_2H_6$) and ethanol, as provided in equation (11).

$$B(OEt)_3 + 3H_2 \rightarrow \tfrac{1}{2}B_2H_6 + 3EtOH \tag{11}$$

The chemical reaction of equation (11) is endothermic. For example, this reaction can be performed in an autoclave 210, as illustrated in FIG. 1. In such an apparatus, an autoclave containing triethyl borane can be pressurized with hydrogen gas to about 100–1000 psi (about 6.8 to about 68 atm.), preferably from about 14 to about 40 atm., and heated at temperatures ranging from about 100° to about 500° C., preferably from about 150° to about 300° C. Typical hydrogenation catalysts, including Raney nickel and activated palladium, silver, or platinum metals and other Group VIII metals, can be used to promote the reaction. The alcohol can be condensed from the gas stream and recycled for use in other reactions of the process.

Lastly, the sodium triethoxyborohydride from the reaction of equation (10) can be directed to an appropriate apparatus to react with the diborane from the reaction of equation (11) to obtain sodium borohydride and triethyl borate, as provided in equation (12).

$$2NaHB(OEt)_3 + B_2H_6 \rightarrow 2NaBH_4 + 2B(OEt)_3 \tag{12}$$

The chemical reaction of equation (12) is exothermic. For example, this reaction can be performed in a gravity bed reactor 200, as illustrated in FIG. 1. In such an apparatus, a gas stream of diborane at pressures ranging from about atmospheric pressure to about 100 psi (6.8 atm.), preferably from about 1 to about 2 atm., can be passed through sodium triethoxyborohydride at temperatures ranging from about −30° C. to about 150° C., preferably from about 70° C. to about 120° C., under an inert atmosphere, such as nitrogen or argon gas. The by-product triethyl borate can be removed by any method or process known to one skilled in the art, e.g., by distillation or separation by gravity, to leave sodium borohydride in quantitative yield. The separated triethyl borate can then be recycled for use in the reaction of equation (11) as shown in FIG. 1 and/or in the reaction of equation (10) to produce sodium triethoxyborohydride.

The reactants for the chemical reactions of equations (9)–(12) can be purchased from commercial sources or, more preferably, can be synthesized in the process plant. In one embodiment of the present invention, sodium borate used in equation (9) can be obtained by purifying borate ore, e.g., mixing the borate ore in a mixing tank while cooling, centrifuging out any undesired materials, and drying the purified borate ore.

This process is illustrated in FIG. 1 as follows. Sodium borate is fed into a crystallizer 10. Some of this sodium borate passes in a recycle loop through a chiller 20, then passes into a centrifuge 30 to further purify it. Impurities from the centrifuge are passed through an ion exchange column 40 and then disposed. The purified sodium borate is then passed into a rotary dryer 50.

The sodium hydride (NaH) used in equation (10) and the hydrogen used in equation (11) can also be synthesized in the process plant, as follows. The sodium bicarbonate produced in equation (9) can be directed to a suitable vacuum dryer to produce sodium oxide ($Na_2O$), carbon dioxide and water, as provided below in the chemical reaction of equation (5c) wherein Y is sodium.

$$2NaHCO_3 \rightarrow Na_2O + 2CO_2 + H_2O \tag{5c}$$

For example, this reaction can be performed in a rotary calciner 140, which is commercially available from the Bethlehem Corporation. In such an apparatus, a slurry of sodium bicarbonate can be heated to between about 400° and about 1000° C., preferably from about 800° to about 900° C., in a rotary dryer with a heated screw agitator, which is capable of dispersing the slurry along the length of the reactor. The high temperature allows the steam to be driven off the solid sodium oxide.

The sodium oxide can then be reacted with methane in a suitable apparatus to provide sodium, carbon monoxide and hydrogen, as shown in equation (14).

$$Na_2O + CH_4 \rightarrow 2Na + CO + 2H_2 \tag{14}$$

The chemical reaction of equation (14) is endothermic. For example, this reaction can be performed in an autoclave 150. In such an apparatus, solid sodium oxide can be heated to from about 500° to about 1200° C., preferably from about 900° to about 1100° C., in an autoclave equipped with turbine stirring, and the reactor pressurized with methane gas at from about atmospheric pressure (1 atm.) to about 1000 psi (68 atm.). The solid can be stirred and heated under this atmosphere, and the product gas stream can be cooled to a temperature from about 100° to about 800° C., preferably from about 100° to about 400° C., to allow separation of molten sodium. The gas stream containing carbon monoxide and hydrogen can then be directed to an appropriate apparatus, such as a shift reactor 170, for reaction of carbon monoxide with steam to produce additional hydrogen gas, as described below.

The methane (natural gas), used in the reaction of equation (14), can be purchased from commercial sources. The sodium produced in the reaction of equation (14) can be easily removed from the other gaseous components, and carbon monoxide can also be removed by using an appropriate apparatus, as provided below in equation (15).

$$CO + H_2O \rightarrow CO_2 + H_2 \tag{15}$$

For example, this reaction can be performed in a shift reactor 170. As is well-known to the skilled artisan, such an apparatus allows the reaction of CO and steam by passing the gas stream over iron and copper catalysts at approximately 425° C. to produce hydrogen and carbon dioxide.

Additional hydrogen gas can be produced by steam reforming of methane as shown in equation (16).

$$CH_4 + H_2O \rightarrow 3H_2 + CO \quad (16)$$

For example, this reaction can be performed in a steam reformer 155, as illustrated in FIG. 1. As is well known to the skilled artisan, methane can be mixed with steam at temperatures from about 450° to about 750° C. and pressures from about 30 to about 40 atmospheres as it enters catalyst tubes containing a nickel catalyst to produce a gas stream of hydrogen and carbon monoxide. The hot gas stream can then be passed through a heat exchanger to provide process heat. Note that the carbon monoxide produced in this reaction can also be used in the reaction of equation (15) to provide additional hydrogen.

The hydrogen produced in the reactions of equations (15) and (16) can be divided into two portions. One portion can be used in the chemical reaction of equation (11) in apparatus 210. The other portion can be used to react with the sodium obtained in equation (14) to provide sodium hydride (NaH) in an appropriate apparatus as shown below in equation (17).

$$2Na + H_2 \rightarrow 2NaH \quad (17)$$

The sodium hydride can then be used in chemical reaction of equation (10) in apparatus 190. For example, the reaction shown in equation (17) can be performed in an autoclave 180. In such an apparatus, molten sodium can be cooled to a temperature from about 100° and to about 800° C., preferably from about 100° to about 400° C., before being introduced into an autoclave equipped with turbine stirring. The reactor can be pressurized with hydrogen gas, ranging from about atmospheric pressure (~1 atm.) to about 1000 psi (68 atm.), preferably from about 5 to about 20 atm., and the molten sodium can be agitated to facilitate thorough mixing. Since NaH is a solid, it can be easily separated by any method and/or process known to the skilled artisan.

The net equation represented by the equations (9) through (17) is shown in equation (18) as follows:

$$NaBO_2 + CH_4 \rightarrow NaBH_4 + CO_2 \quad (18)$$

The overall equation is endothermic, where the steps represented by equations (9), (11), (14), and (16) are the key energy-consuming steps of the process. Thermodynamic values for each of the reactions in this embodiment are shown below. All thermodynamic values are taken from the *CRC Handbook of Chemistry and Physics,* 69th Edition, 1988–1989, which is incorporated herein by reference. The overall process of this embodiment is also favorable in that it is a cyclic process best represented by the listing of all reactions below. As shown, the reaction can consume only methane and borate to produce sodium borohydride and carbon dioxide. All other reagents can be generated within the process.

|  |  | BTU/ lb NaBH$_4$ |
|---|---|---|
| 2 NaBO$_2$ + CO$_2$ + ½ H$_2$O | → | NaHCO$_3$ + ½ Na$_2$O·2B$_2$O$_3$ |
| ½ Na$_2$O·2B$_2$O$_3$ + 6EtOH | → | 2B(OEt)$_3$ + 2NaOH + 2.5 H$_2$O |
| NaHCO$_3$ | → | ½ Na$_2$O + CO$_2$ + ½ H$_2$O |
| NaOH | → | ½ Na$_2$O + ½ H$_2$O | 831 BTU (877 kJ) |
| CH$_4$ + Na$_2$O | → | 2Na + CO + 2 H$_2$ | 1642 BTU (1732 kJ) |
| 2Na + H$_2$ | → | 2NaH |  |
| 2B(OEt)$_3$ + 2NaH | → | 2NaHB(OEt)$_3$ |  |
| CH$_4$ + H$_2$O | → | 3H$_2$ + CO | 856 BTU (903 kJ) |
| 2CO + 2H$_2$O | → | H$_2$ + 2CO$_2$ |  |
| 2B(OEt)$_3$ + 6H$_2$ | → | B$_2$H$_6$ + 6EtOH | 2991 BTU (3155 kJ) |
| 2NaHB(OEt)$_3$ + B$_2$H$_6$ | → | 2NaBH$_4$ + 2B(OEt)$_3$ |  |
| Overall: 2NaBO$_2$ + 2CH$_4$ | → | 2NaBH$_4$ + 2CO$_2$ | 7528 BTU (7941 kJ) |

For illustrative purposes, sodium borohydride can be reacted with water to produce hydrogen gas. The energy equivalent of hydrogen gas is about 50,957 BTU per pound. Since each pound of sodium borohydride can theoretically produce about 0.211 pounds of hydrogen gas, each pound of sodium borohydride can theoretically yield about 10,752 BTU. The actual cost of producing borohydride can be found by adding 7528 BTU from the above process, 1130 BTU (resulting from 15% plant inefficiency), and 9094 BTU (the energy equivalent of methane), giving a total of 17,752 BTU required to produce sodium borohydride in the plant. According to this calculation, the energy efficiency of producing sodium borohydride according to this embodiment of the present invention (e.g., the comparison of the energy needed for production versus the energy provided) would be about 61% (10,752/17,752×100).

This is an improvement over commercial processes that generate sodium borohydride from sodium or sodium-based compounds. Calculated on a per pound of sodium borohydride produced basis, the process shown in equation (1) requires the energy equivalent of 4,547 BTU of methane and an additional 18,476 BTU of energy to drive the reactions. Assuming 15% inefficiency in the plant, e.g., 2,770 BTU of energy is lost in normal plant operation, the total energy required is about 25,793 BTU. The resulting energy efficiency of the process is about 42% (10,752/25,793×100).

Figure 2:
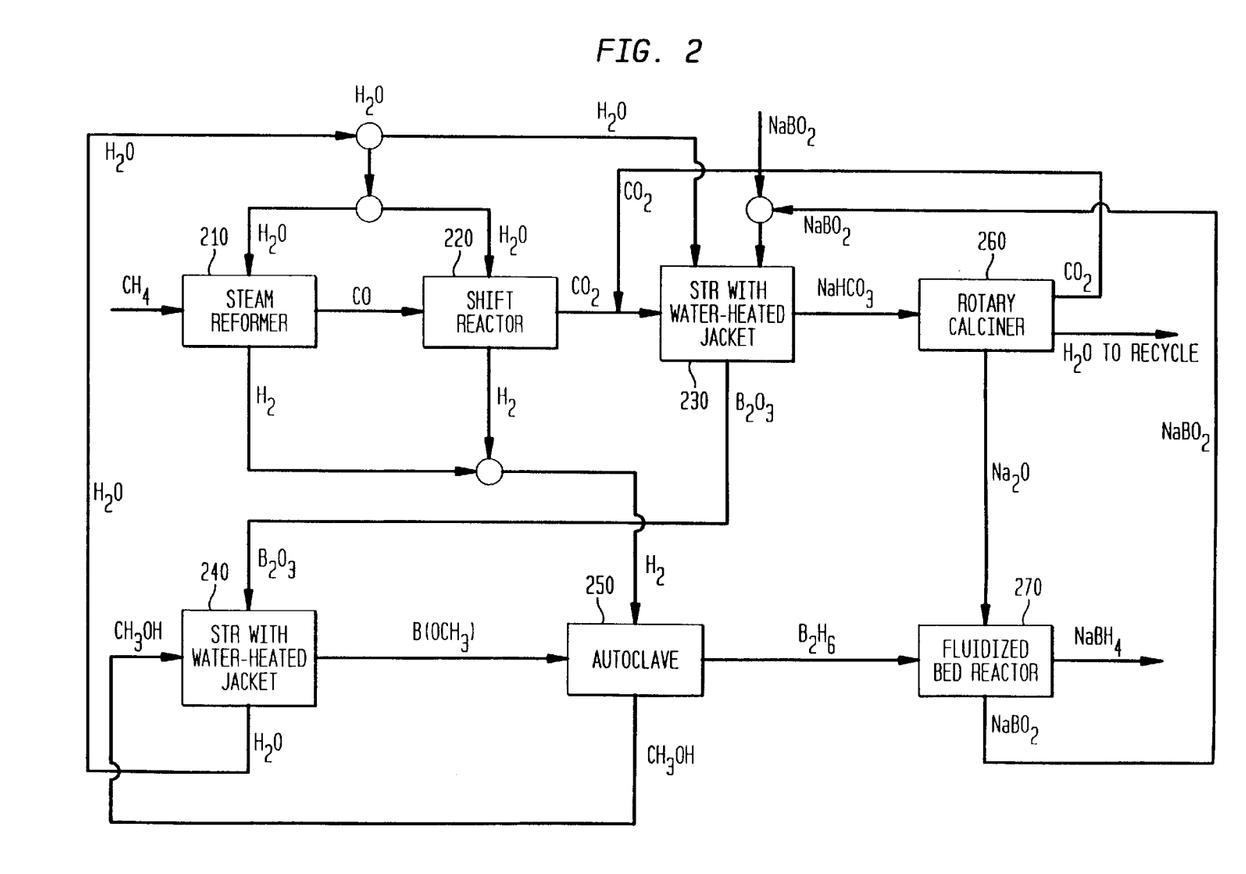
FIG. 2 is a flow diagram, which illustrates another embodiment for producing borohydride compounds in accordance with the present invention.

In another embodiment of the present invention, as illustrated in FIG. 2, YBO$_2$ is chosen to be sodium borate (NaBO$_2$) and HX is chosen to be ROH, i.e. an alcohol. In this embodiment, borate is converted to a trialkyl borate via a borax intermediate. The trialkyl borate is then converted to diborane, which is known to disproportionate to borohydride under appropriate reaction conditions. This process can be further described in part by the following set of chemical reactions and formulae.

In the first step, borax is prepared by acidic dehydration of sodium borate with carbon dioxide as shown in equation (9a). Mineral acids can be used as alternatives, but will eliminate the carbon dioxide to sodium bicarbonate recycle loop.

$$2NaBO_2 + 2CO_2 + \tfrac{1}{2}H_2O \rightarrow NaHCO_3 + \tfrac{1}{2}Na_2O \cdot 2B_2O_3 \quad (9a)$$

For example, this reaction can be performed in a stirred tank reactor with a water-heated jacket 230, as illustrated in FIG. 2. In such an apparatus, a slurry of sodium borate and water can be stirred in a reactor equipped with paddle type stirring at temperatures ranging from about room temperature to about 250° C., preferably from about 175° to about 200° C. The reactor can be pressurized with carbon dioxide at a pressure from about 10 psi (0.68 atm.) to about 750 psi (51 atm.), preferably from about 30 to about 40 atm. The borax produced can be removed from the reactor by any method or process known to one skilled in the art, such as by filtration.

The borax produced in the reaction of equation (9a) can then be reacted with a lower alkanol, such as methanol, in an appropriate reactor, as shown in equation (19).

$$½Na_2O \cdot 2B_2O_3 + 6CH_3OH \rightarrow 2B(OCH_3)_3 + NaOH + 2.5H_2O \qquad (19)$$

For example, this reaction can be performed in a stirred tank reactor with a water-heated jacket 240. Solid borax can be heated to a temperature from about room temperature to about 100° C., preferably from about 55° to about 70° C., as a slurry in methanol for about 1 to about 6 hours in a reactor equipped with paddle type stirring. The resulting trimethyl borate can be removed as it forms by any method or process known to one skilled in the art, such as by distillation.

The reactions of equations (9a) and (19) can be taken separately or combined into one step to directly convert $NaBO_2$ to $B(OCH_3)_3$ in methanol with carbon dioxide as shown in equation (20). The combined process is exothermic and can be driven to completion by continuous distillation of trimethyl borate from the reactor, not shown.

$$NaBO_2 + CO_2 + 3CH_3OH \rightarrow B(OCH_3)_3 + NaHCO_3 + H_2O \qquad (20)$$

Both versions are encompassed by this embodiment of the present invention. Diborane can then be produced by direct hydrogenation of the trimethyl borate, which can be obtained from the reactions of equations (19) and/or (20). After separation from the other products of reactions (19) and/or (20) by any method or process known to the skilled artisan, the trimethyl borate can be reacted with hydrogen gas in a pressurized apparatus to produce diborane and methanol, as shown in equation (21).

$$2B(OCH_3)_3 + 6H_2 \rightarrow B_2H_6 + 6CH_3OH \qquad (21)$$

For example, this reaction can be performed in an autoclave 250, as illustrated in FIG. 2. An autoclave containing trimethyl borate can be pressurized with hydrogen gas at a pressure from about 100 (6.8 atm.) to about 1000 psi (68 atm.), preferably from about 7 to about 15 atm., and heated at temperatures ranging from about 100° to about 500° C., preferably from about 200° to about 300° C. Typical hydrogenation catalysts, including Raney nickel and activated palladium, silver, or platinum metals and other Group VIII metals, can be used to promote the reaction. The methanol can be separated from the gas stream by any process or method known to the skilled artisan, such as by condensation, and recycled in the process.

Diborane can undergo asymmetric cleavage and subsequent disproportionation as shown in reaction (22) through (24) by reaction with any small, hard base, such as $F^-$, $OH^-$, $O^{-2}$, $CO_3^{2-}$, $NH_3$, $Cl^-$, $CH_3NH_2$, and $(CH_3)_2NH$. Additional examples of hard bases are provided in Shriver et al., *Inorganic Chemistry* (1990, W. H. Freeman Company), which is incorporated herein by reference. Preferred bases are the oxide, the hydroxide and the carbonate. In concentrated aqueous sodium hydroxide, for example, at reduced temperatures, e.g., from about –20° C. to about 20° C., preferably at about 0° to 5° C., the disproportionation occurs in two steps: (i) asymmetric cleavage into a borohydride anion and a $BH_2^+$ fragment which coordinates two hydroxides and then (ii) disproportionation of the two $BH_2^+$ fragments into an additional borohydride anion and a tetrahydroxyborate ion. Preferably, in this reaction, there are between about 0.1 and 10 molar equivalents of the base for every molar equivalent of diborane present in the rector.

Water can be replaced with a nonaqueous aprotic solvent or a nonaqueous polar solvent in the above-described reaction to minimize competitive hydrolysis of the $BH_2^+$ fragment and allow the disproportionation to be achieved with higher efficiency, thereby providing greater yield. Hydrolysis, on the other hand, results in the release of hydrogen rather than disproportionation, and a substantial energy loss occurs. Examples of acceptable nonaqueous aprotic solvents include, without intended limitation, hydrocarbons, such as, hexane or heptane; amides, such as, dimethylacetamide; and glymes, such as, diethylene glycol dimethyl ether (diglyme) and tetra(ethylene glycol) dimethyl ether (tetraglyme). Examples of suitable nonaqueous polar solvents include, without intended limitation, methanol, ethanol, propanol, isopropanol, and ionic liquids such as imidazolium, pyridinium, phosphonium, and tetralkylammonium compounds.

Alternatively, this reaction can be accomplished without the use of a solvent, as illustrated by the chemical reactions of equation (22) through (24). A gas stream of diborane obtained from reaction (22) can be passed through or over solid base in an appropriate apparatus, e.g. a fluidized bed, a ball mill, or other apparatus capable of agitating the reaction mixture. Diborane is an extremely reactive compound, and is known to react from the gas stream.

$$2B_2H_6 + 2Na_2O \rightarrow 3NaBH_4 + NaBO_2 \qquad (22)$$

$$2B_2H_6 + 4NaOH \rightarrow 3NaBH_4 + NaBO_2 + 2H_2O \qquad (23)$$

$$2B_2H_6 + 2Na_2CO_3 \rightarrow 3NaBH_4 + NaBO_2 + 2CO_2 \qquad (24)$$

For example, this reaction can be performed in a fluidized bed reactor 270 in the absence of a solvent or a jacketed stirred tank reactor, not shown, with a nonaqueous solvent as described above. A preferred nonaqueous solvent is a glyme, such a diglyme. The reaction is preferably carried out at a temperature between about –5° C. and 100° C. and at pressures between about 14 psi (1 atm) and 200 psi (13.6 atm), preferably between about 14 psi (1 atm) and 100 psi (6.8 atm). Preferably, the reaction is carried out at a temperature between about 70° C. and 80° C. for from about 30 seconds to 100 hours. For each mole of diborane in the reaction medium, there are between about 0.1 and ten, preferably between about five and ten, molar equivalents of the base.

Alternatively, in a reactor equipped with paddle type stirring and a jacket that allows water heating or cooling, diborane can be bubbled through a slurry or suspension of the base in a nonaqueous aprotic solvent or nonaqueous polar solvent as described above, preferably in a glyme, at temperatures ranging from about –30° C. and 120° C., preferably from about 70° C. and 80° C. Such a reactor can advantageously be incorporated into a process for the generation of diborane in that the product can be introduced directly into the reactor, thereby eliminating the need to store large quantities of diborane. The reaction is carried out under an inert atmosphere, such as nitrogen or argon gas for from about 30 seconds to about 70 hours. For each mole of diborane in the reaction medium, there are between about one and ten, preferably between about five and ten, molar equivalents of the base. The resulting sodium borohydride can then be separated from sodium borate by any process or method known to the skilled artisan, such as by liquid extraction. The separated sodium borate can be recycled for use in the initial step of the process, i.e., the reaction of equation (9a).

The reactants for the process of this embodiment can be purchased from commercial sources, or preferably, generated in the process plant as previously described. For example, the carbon dioxide used in the reaction of equation (9a) and the oxide base, the hydroxide and the carbonate are all commercial available or may be readily prepared by known techniques utilizing known starting materials. The sodium oxide used in the reaction of equation (22) can be obtained by converting the sodium bicarbonate generated in the reaction of equation (9a) or equation (20) in an appropriate apparatus, as shown in equation (5c) wherein Y is sodium. The reaction dehydrates the $NaHCO_3$ and is endothermic.

$$2NaHCO_3 \rightarrow Na_2O + 2CO_2 + H_2O \tag{5c}$$

For example, the conversion can be performed in a rotary calciner (kiln) 260, such as a model manufactured by the Bethlehem Corporation. A slurry of sodium bicarbonate can be heated to a temperature from 400° C. and 1000° C., preferably from about 800° C. and 900° C., at a pressure from about 0 to about 5 atm., preferably from about 0 to about 1 atm., in a rotary dryer with a heated screw agitator, which disperses the slurry along the length of the reactor. Solid sodium oxide can be separated from a gas stream of carbon dioxide and steam by any method or process known to the skilled artisan.

The sodium carbonate used in the reaction of equation (24) can be obtained by converting the sodium bicarbonate generated in the reaction of equation (9a) or equation (20) in an appropriate apparatus, as shown in equation (5ci).

$$2NaHCO_3 \rightarrow Na_2CO_3 + 2CO_2 + H_2O \tag{5ci}$$

The conversion of $NaHCO_3$ into the above-described end products also dehydrates the $NaHCO_3$ by thermal decomposition (i.e., heating), but at a lower temperature than the reaction of equation (5c). Preferably, reaction (5ci) is conducted at a temperature from about 50° to about 120° C. in an appropriate apparatus, such as a rotary dryer. Dehydration of sodium bicarbonate can be performed between 0 and 1 atmospheres. The solid $Na_2CO_3$ is removed from the gaseous steam and carbon dioxide by any method or process known in the art.

Furthermore, the hydrogen gas used in the chemical reaction of equation (22) can be obtained by steam reforming of methane, as described in equation (16).

$$CH_4 + H_2O \rightarrow 3H_2 + CO \tag{16}$$

For example, this reaction can be performed in a steam reactor 210, as illustrated in FIG. 2. As is well known to the skilled artisan, methane can be mixed with steam at temperatures of about 450° C. to 750° C. for and pressures from about 30 to about 40 atmospheres as the mixture enters catalyst tubes containing nickel catalyst to produce a gas stream of hydrogen and carbon monoxide. The hot gas stream can then be passed through a heat exchanger to provide process heat if needed. Carbon dioxide may also be obtained from the reaction with diborane wherein the base is a carbonate, as shown in equation 30. The water used in this reaction can be obtained from commercial sources, the water produced by the chemical reaction of equation (19) in apparatus 240, and/or the reaction of equation (5ci) in apparatus 260. The methane can be obtained from commercial sources.

The carbon dioxide used in the chemical reaction of equation (9a) can be obtained from the reaction of equation (15). Additional carbon dioxide can also be obtained by processing the carbon monoxide obtained from the chemical reaction of equation (16) in an appropriate apparatus, as illustrated by equation (15).

$$CO + H_2O \rightarrow CO_2 + H_2 \tag{15}$$

For example, this reaction can be performed in a shift reactor 220, as illustrated in FIG. 2. As is well-known to the skilled artisan, such an apparatus allows the reaction of CO and steam by passing the gas stream over iron and copper catalysts at about 425° C. to produce hydrogen and carbon monoxide. The hydrogen produced by this reaction can be used in the chemical reaction of equation (21). The water used in this reaction can be obtained from commercial sources, from the water produced by the chemical reaction of equation (19) in apparatus 240, and/or the reaction of equation (5ci) in apparatus 260.

The net equation of this embodiment is the same as the first embodiment:

$$NaBO_2 + CH_4 \rightarrow NaBH_4 + CO_2 \tag{18}$$

The steps represented by equations (21), (5c) and (16) are the key energy-consuming steps of the process. Calculated on a per pound of sodium borohydride produced basis, this reaction requires the energy equivalent of 9094 BTU of methane and an additional 6701 BTU of energy to drive the reactions. Assuming 15% inefficiency in the plant, approximately 1005 BTU of energy is lost as a result of normal plant operation. The total energy required by the system to practice the chemical reaction of equation (13) is about 16,800 BTU per pound of sodium borohydride produced. According to the calculation described earlier, the energy efficiency of the sodium borohydride (e.g., the comparison of the energy needed for production versus the energy provided) would be 64% (10,752/16,800×100).

The energy required for the individual reactions is shown below.

| | | | BTU/ lb $NaBH_4$ |
|---|---|---|---|
| $4NaBO_2 + 4CO_2 + 12CH_3OH$ | $\rightarrow$ | $4NaHCO_3 + 4B(OCH_3)_3 + 4H_2O$ | |
| $4NaHCO_3$ | $\rightarrow$ | $4Na_2O + 4CO_2 + 2H_2O$ | 1707 BTU (1801 kJ) |
| $4B(OCH_3)_3 + 12H_2$ | $\rightarrow$ | $2B_2H_6 + 12CH_3OH$ | 3282 BTU (3463 kJ) |
| $3CH_4 + 3H_2O$ | $\rightarrow$ | $9H_2 + 3CO$ | 1712 BTU (1806 kJ) |
| $3CO + 3H_2O$ | $\rightarrow$ | $3H_2 + 3CO_2$ | |
| $2Na_2O + 2B_2H_6$ | $\rightarrow$ | $3NaBH_4 + NaBO_2$ | |
| Overall: $3NaBO_2 + 3CH_4$ | $\rightarrow$ | $3NaBH_4 + 3CO_2$ | 6701 BTU (7070 kJ) |

The overall process of this embodiment is also favorable in that it is a cyclic process best represented by the listing of all reactions above. As shown, the reaction consumes only methane and borate and produces only sodium borohydride and carbon dioxide. All other reagents can be regenerated within the process. Thus, the process represents a closed loop, requiring only the input of methane and energy.

Alternatively, diborane used in the chemical reaction of equation (23) can be obtained by reacting a boric oxide with a halogen gas, such as chlorine, and then hydrogenating the resulting boron trihalide, as illustrated in the reactions of equations (25a) and (25b).

$$2B_2O_3 + 6X_2 + 3C \rightarrow 4BX_3 + 3CO_2 \quad (25a)$$

$$4BX_3 + 12H_2 \rightarrow 2B_2H_6 + 12HX \quad (25b)$$

wherein X is selected from the group consisting of F, Cl, Br, and I. Reactions of boric oxides are well-known in the art, as described in Hughes, "Production of the Boranes and Related Research," p. 3.

Typically, $BX_3$ can be obtained by heating solid boric oxide and carbon coal to a temperature between about 250° and about 850° C., preferably between about 600° and about 700° C., in an autoclave under a halogen gas atmosphere. The reactor can be pressurized with halogen gas, at a pressure of from between about atmospheric pressure (I atm.) to about 500 psi (34 atm.), preferably from between about 5 and 10 atm. The boron trihalide can be condensed from the gas stream and isolated as a liquid by any method and/or process known to the skilled artisan.

The use of excess carbon allows the in situ reduction of carbon dioxide to carbon monoxide as illustrated by the following chemical reaction: $CO_2 + C \rightarrow 2CO$. The resulting carbon monoxide can then be introduced into a shift reactor to react with steam to produce additional process hydrogen.

Diborane can also be obtained from hydrogenation of alkylboranes, which are prepared by reacting boron trihalides with organoaluminum compounds or Grignard reagents of the formula RMgX, wherein R is a $C_{1-4}$ alkyl, and X is Cl, Br, or I. Such reactions are well-known in the art, as described in Shriver et al., *Inorganic Chemistry* (1990, W. H. Freeman Company), which is incorporated herein by reference. An example of this type of reaction is shown below in reactions (25c) and (25d). In these reactions, liquid boron trihalide ($BX_3$) can be added to solid alkylaluminum under an inert atmosphere in a stir-tank reactor equipped with turbine stirring at a temperature from about −30° C. and 100° C., preferably from about 20° C. and 50° C. The alkylborane can be removed by distillation, and thereafter hydrogenated.

$$2BX_3 + Al_2(R)_6 \rightarrow 2AlX_3 + 2BR_3 \quad (25c)$$

$$4BR_3 + 12H_2 \rightarrow 2B_2H_6 + 12HR \quad (25d)$$

wherein each R is independently selected from the group consisting of $CH_3$ and $C_2H_5$.

It should be noted that the above processes for obtaining a Y-containing base and a boron-containing compound can be combined with either of the two ways of producing a Y-borohydride and carbon dioxide. One embodiment of one possible combination is shown in the reactions below:

| | | | BTU/lb $NaBH_4$ |
|---|---|---|---|
| $4NaBO_2 + 4CO_2 + 12CH_3OH$ | → | $4NaHCO_3 + 4B(OCH_3)_3 + 4H_2O$ | |
| $4NaHCO_3$ | → | $4Na_2O + 4CO_2 + 2H_2O$ | 1707 BTU (1801 kJ) |
| $CH_4 + Na_2O$ | → | $2Na + CO + 2H_2$ | 1641 BTU (1731 kJ) |
| $2Na + H_2$ | → | $2NaH$ | |
| $2B(OMe)_3 + 2NaH$ | → | $2NaHB(OMe)_3$ | |
| $CH_4 + H_2O$ | → | $3H_2 + CO$ | 807 BTU (851 kJ) |
| $2CO + 2H_2O$ | → | $2H_2 + 2CO_2$ | |
| $2B(OMe)_3 + 6H_2$ | → | $B_2H_6 + 6MeOH$ | 3430 BTU (3619 kJ) |
| $2NaHB(OMe)_3 + B_2H_6$ | → | $2NaBH_4 + 2B(OMe)_3$ | |
| Overall: $2NaBO_2 + 2CH_4$ | → | $2NaBH_4 + 2CO_2$ | 7585 BTU (8002 kJ) |

In this process, 15% plant inefficiency leads to a loss of about 1138 BTU (1200 kJ). This number must be added to about 7585 BTU (8002 kJ) necessary for the above reactions, and about 9094 BTU (9594 kJ) for the energy equivalent of methane. Thus, the overall energy needed for this plant process requires about 17,817 BTU (18,796 kJ), and the overall efficiency of the process is about 60% (10,752 BTU/17,817 BTU×100).

In another embodiment, X is chosen to be chlorine. Boric oxide can be reacted with carbon and chlorine gas to obtain boron trichloride. The hydrogen chloride byproduct from the boron trichloride hydrogenation is converted to chlorine gas by reaction with oxygen and catalytic CuCl, which is nonstoichiometric and is not consumed in the process. These reactions are shown below, with the reactions involving the recycle loop shown in boldface.

| | |
|---|---|
| $B_2O_3 + \frac{3}{2}C + 3Cl_2$ | → $2BCl_3 + \frac{3}{2}CO_2$ |
| $CH_4 + Na_2O$ | → $2Na + CO + 2H_2$ |
| $2Na + H_2$ | → $2NaH$ |
| $2BCl_3 + 2NaH$ | → $2NaHBCl_3$ |
| $CH_4 + H_2O$ | → $3H_2 + CO$ |
| $2CO + 2H_2O$ | → $2H_2 + 2CO_2$ |
| $2BCl_3 + 6H_2$ | → $B_2H_6 + 6HCl$ |
| $6HCl + \frac{3}{2}O_2 + CuCl(solid)$ | → $3Cl_2 + 3H_2O$ |
| $2NaHBCl_3 + B_2H_6$ | → $2NaBH_4 + 2BCl_3$ |
| Overall: $2NaBO_2 + 2CH_4 + \frac{3}{2}C + \frac{3}{2}O_2$ | → $2NaBH_4 + \frac{7}{2}CO_2$ |

Carbon dioxide can be reclaimed from the boric oxide, carbon, and chlorine reaction shown in boldface above. In the presence of excess carbon, carbon dioxide is converted to carbon monoxide through the reaction as described above. The carbon monoxide can then be introduced into the shift reactor for preparation of additional hydrogen. Ideally, this would occur in one step as shown below in equation (26):

$$B_2O_3 + 3C + 3Cl_2 \rightarrow 2BCl_3 + 3CO. \quad (26)$$

Methane can be used instead of carbon in a variation on the route shown above. A stream of methane gas passed through hot boric oxide will generate carbon and hydrogen gas in the reactor. Ideally, this process would be coupled with direct hydrogenation of boron trichloride to produce diborane. This variation is shown below, with the recycle loops in boldface.

| | |
|---|---|
| $2NaBO_2 + CO_2 + \frac{1}{2}H_2O$ | → $NaHCO_3 + \frac{1}{2}Na_2O.2B_2O_3$ |
| $\frac{1}{2}Na_2O.2B_2O_3$ | → $\frac{1}{2}Na_2O + B_2O_3$ |
| $NaHCO_3$ | → $\frac{1}{2}Na_2O + CO_2 + \frac{1}{2}H_2O$ |
| $B_2O_3 + \frac{3}{2}CH_4 + 3Cl_2$ | → $2BCl_3 + \frac{3}{2}CO_2 + H_2$ |
| $2BCl_3 + 6H_2$ | → $B_2H_6 + 6HCl$ |
| $CH_4 + Na_2O$ | → $2Na + CO + H_2$ |
| $2Na + H_2$ | → $2NaH$ |
| $2BCl_3 + 2NaH$ | → $2NaHBCl_3$ |

Alternative methods to produce boron trichloride would use other known chlorinating agents beside hydrogen chloride and chlorine, which are the preferred reagents. Other possible chlorinating agents include phosgene ($COCl_2$) and methods to generate phosgene in situ (such as by adding carbon monoxide to chlorine gas), phosgene equivalents including diphosgene (trichloromethylchloroformate) and triphosgene (bis(trichloromethyl)carbonate), thionyl chloride ($SOCl_2$), and phosphorus chlorides including phosphorus trichloride and phosphorus pentachloride.

Another possible embodiment of the present invention involves using both chlorine and the methoxy group as "X" in the reactions. This set of reactions, shown below, allows for recycle loops involving both hydrogen chloride and $B(OMe)_3$. Reactions involving recycle loops are printed in boldface.

What is claimed is:

1. A process for producing borohydride compounds represented by the formula $YBH_4$, comprising:
   (A) reacting a boron-containing compound represented by the formula $BX_3$ with hydrogen or an aldehyde selected from the group consisting of formaldehyde, benzaldehyde, acetaldehyde, and mixtures thereof to obtain diborane; and
   (B) reacting the diborane with a Y-containing base selected from those represented by the formula $Y_2O$, YOH and $Y_2CO_3$ to obtain $YBH_4$ and $YBO_2$,
   wherein Y is selected from the group consisting of the alkali metals, pseudo-alkali metals, alkaline earth metals, an ammonium ion, and quaternary amines of the formula $NR_4^+$, wherein each R is independently selected from hydrogen and a straight- or branched-chain $C_{1-4}$ alkyl group; and
   wherein X is selected from the group consisting of halide ions, —OH, —R' and —OR' groups, chalcogens, and chalcogenides, wherein R' is a straight- or branched-chain $C_{1-4}$ alkyl group.

2. A process in accordance with claim 1, wherein Y is selected from the group consisting of $Na^+$, $Li^+$, $K^+$, $Mg^{++}$ and $Ca^{++}$ and X is selected from the group consisting of a halide ion and —OR'.

3. A process in accordance with claim 1, wherein the Y-containing base represented by the formula $Y_2O$, and the boron-containing compound of formula $BX_3$ are obtained by a process comprising:
   reacting a borate of the formula $YBO_2$ with $CO_2$ and an alcohol to obtain $YHCO_3$ and $BX_3$; and
   converting the $YHCO_3$ to $Y_2O$ by heating to a temperature from about 400° to about 1000° C.,
   wherein X is an –OR' group.

4. A process in accordance with claim 3, wherein Y is sodium and said borate is represented by the formula $Na_2O \cdot xB_2O_3 \cdot yH_2O$, wherein x is 1 to 5 and y is 0 to 10.

5. A process in accordance with claim 1, wherein the Y-containing base is represented by the formula $Y_2CO_3$, and the boron-containing compound of formula $BX_3$ are obtained by the process comprising:
   reacting a borate of the formula $YBO_2$ with $CO_2$ and an alcohol to obtain $YHCO_3$ and $BX_3$; and
   converting the $YHCO_3$ to $Y_2CO_3$ at a temperature from about 50° to about 120° C. wherein X is an —OR' group.

6. A process in accordance with claim 5, wherein Y is sodium and said borate is represented by the formula $Na_2O \cdot xB_2O_3 \cdot yH_2O$, wherein x is 1 to 5 and y is 0 to 10.

7. A process in accordance with claim 1, wherein, in step (A), $BX_3$ is reacted with hydrogen.

8. A process in accordance with claim 1, wherein in step (B), said base is $Y_2CO_3$, the reaction is carried out in an aqueous solution of said base at a temperature of from about –5° C. to about 20° C. and said solution contains from about 0.1 to 10 molar equivalents of said base for every molar equivalent of diborane present.

9. A process for producing borohydride compounds represented by the formula $YBH_4$, comprising reacting gaseous diborane in the absence of solvent with a Y-containing base selected from those represented by the formula $Y_2O$, YOH and $Y_2CO_3$ to obtain $YBH_4$ and $YBO_2$, wherein Y is selected from the group consisting of the alkali metals, pseudo-alkali metals, alkaline earth metals, an ammonium ion and quaternary amines of the formula $NR_4^+$, wherein each R is independently selected from hydrogen and a straight- or branched-chain $C_{1-4}$ alkyl group.

10. A process in accordance with claim 8 further comprising agitating the gaseous diborane and the base during the reaction.

11. A process in accordance with claim 10, wherein said gaseous diborane and said base are agitated in a ball mill during said reaction.

12. A process in accordance with claim 9, wherein Y is selected from the group consisting of $Na^+$, $Li^+$, $K^+$, $Mg^{++}$ and $Ca^{++}$.

13. A process in accordance with claim 9, wherein diborane and said base are reacted at a temperature between about –5° C. and about 100° C. for from about 30 seconds to about 100 hours.

14. A process in accordance with claim 9, wherein from about 0.1 and about ten molar equivalents of said base are present for every molar equivalent of diborane.

15. A process in accordance with claim 9, wherein diborane and said base are reacted at a pressure between about 14 psi and about 200 psi.

16. A process for producing borohydride compounds represented by the formula $YBH_4$, comprising reacting gaseous diborane with a Y-containing base in suspension in a nonaqueous aprotic solvent or a nonaqueous polar solvent, said base being selected from those represented by the formula $Y_2O$, YOH and $Y_2CO_3$ to obtain $YBH_4$ and $YBO_2$, wherein Y is selected from the group consisting of the alkali metals, pseudo-alkali metals, alkaline earth metals, an ammonium ion and quaternary amines of the formula $NR_4^+$, wherein each R is independently selected from hydrogen and a straight- or branched-chain $C_{1-4}$ alkyl group.

17. A process in accordance with claim 16 further comprising agitating said suspension during the reaction.

18. A process in accordance with claim 17, wherein said suspension is agitated in a ball mill during said reaction.

19. A process in accordance with claim 16, wherein Y is selected from the group consisting of $Na^+$, $Li^+$, $K^+$, $Mg^{++}$ and $Ca^{++}$.

20. A process in accordance with claim 16, wherein diborane and said base are reacted at a temperature between about −30° C. and about 80° C. for from about 30 seconds to about 70 hours.

21. A process in accordance with claim 16, wherein from about 0.1 and about ten molar equivalents of said base are present for every molar equivalent of diborane.

22. A process in accordance with claim 16, wherein the non-aqueous solvent is a glyme.

* * * * *